Nov. 7, 1933.  S. SCHNETZER  1,933,936

WELDING APPARATUS

Original Filed June 7, 1932   2 Sheets-Sheet 1

Inventor
SIEGFRIED SCHNETZER,
Attorneys

Nov. 7, 1933.     S. SCHNETZER     1,933,936
WELDING APPARATUS
Original Filed June 7, 1932     2 Sheets-Sheet 2

SIEGFRIED SCHNETZER,

Patented Nov. 7, 1933

1,933,936

UNITED STATES PATENT OFFICE 1,933,936

WELDING APPARATUS

Siegfried Schnetzer, Bear Creek, Md., assignor to General Aviation Corporation, Dundalk, Md., a corporation of Delaware Continuation of application Serial No. 615,924, June 7, 1932. This application March 13, 1933. Serial No. 660,545

10 Claims. (Cl. 219—4)

It is the object of my invention to provide a means, method and apparatus by which a welding apparatus so controls within itself the application of welding current according to its needs at various instances during the welding operation so that a perfect weld is secured irrespective of the condition of the electrode tips and the surface conditions of the work pieces.

Heretofore, attempts have been made in the art to control the various factors of current, pressure, time, heat and resistance, as well as surface conditions encountered during the series of welding operations.

My invention is to accept resistance variations as inevitable and to provide a method of welding and apparatus for practicing the welding method which will automatically accommodate itself to an infinite variety of resistance conditions which may change within a welding operation or within a series of welding operations and give dependably a uniform weld no matter what the variations are in conditions. Also, it is my invention to make my apparatus self-controlling by the change of resistance conditions in the welding circuit at various instances during a welding operation and during a series of welding operations to automatically obtain a fusing action through accommodation to the variations in resistance to such an extent as may be necessary to accomplish a perfect dependable and uniform weld in a series of welding operations.

I hereby eliminate variation in quality and size of the welds which have heretofore occurred even when produced by accurate setting of time pressure and current supply.

In particular, it is the object of my invention to apply the welding current when the decrease of resistance in the control circuit including the work pieces has reached a predetermined value so that the welding current is applied at the predetermined resistance value, the decrease in resistance not being taken for granted as appropriate to this increase in pressure.

In particular, I provide a control for applying welding current by utilizing a secondary of a transformer of which the work to be welded is a part and in which the work is part of the secondary from which resistance changes originate.

Upon the accomplishment in this secondary of a predetermined decrease in resistance, which indicates the time and place for the application of welding current, I effect through the primary operation a closure of the welding circuit and thereby apply the welding current to the performance of the welding. While this decrease in resistance is progressing, the admittance of the welding current is prevented until the decrease in resistance has reached that predetermined value at which a good weld is produced.

It is my object to provide for resistance in the secondary including the work as a prime factor and pressure a secondary factor. It is my object to provide a method of actually employing resistance values as a prime factor in controlling fusing, instead of using pressure as the prime factor. I find that pressure and resistance relations are not dependably related to one another and are susceptible of such serious discrepancies as to fail to fuse or to over-fuse by burning a hole or to make a weld, all with the same settings. I also find that accurate timing of the application of the current will likewise fail and not give uniform results.

In particular, my invention is adapted to non-ferrous metals and alloys where resistance welding has heretofore not been satisfactory, as, for instance, in the manufacture of aircraft where such alloys are used and absolute dependability and uniformity are required.

In particular, it is my object to eliminate the conventional practice of applying welding current if a maximum predetermined pressure has been obtained because uniform pressure will not necessarily result in a uniform welding, heating or fusing condition, which is a prerequisite of a uniform weld under a given value of current and time.

In particular, it is my object to provide a small current which is imposed on the regular primary leads while the welding machine is idle with welding secondary or electrode tips open.

Upon closing the tips with increased pressure on the work, there will result an increasing conductance or decreasing resistance and consequently an increasing consumption of current in the secondary.

Upon the accomplishment of a sufficient current in the secondary affecting a relay in a pilot circuit, which operates at predetermined values of current, the relay will then be operated and close the welding circuit to apply the welding current at the predetermined resistance value between the tips of the electrodes on the work irrespective of the surface condition of the metal, the time, the pressure, etc.

I, therefore, eliminate the pressure-controlled welder of the prior art which has no control over resistance, which is one of the three predominating factors in resistance welding, such as current, time and resistance.

It is my object to provide a suitable current of low voltage for the pilot circuit.

The effect of leakage is minimized, or prevented, or made ineffective by the application of a suitable pilot current.

For instance, it is the object of my invention, to provide a method and apparatus for welding so that, if the spot to be welded happens to have a low resistance due to incidental cleanliness, the welding current will be started at a low pressure, thus resulting in a regular weld despite the irregular condition of this particular area before welding, and, if the area which is to be welded has a high resistance due to unfavorable surface conditions, the current will not start until additional pressure has reduced the resistance to the desired value so as to apply the welding current to secure a satisfactory weld.

It is my object to provide a method and apparatus of controlling the welding operation as to current and duration of applying the current controllable by variations in the welding secondary.

To secure perfect welds it is only essential that a predetermined amount of electrical energy be expended in the work pieces in a predetermined time, at predetermined contact conditions between the electrode tips and the surfaces of the work pieces to be welded. The only variable that I can accept and the only variable that it is necessary to accept to eliminate all elements due to the human equation, is that due to contact conditions between electrode tips and the surfaces of the work pieces, or, in other words, the electrical resistance in that part of the circuit between the welding electrode tips.

Referring to the drawings.

Figure 1:
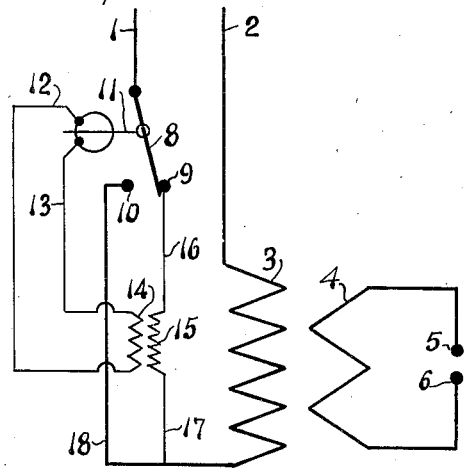
Figure 1 shows the parts in position in the circuit where the circuit is idle.
Figure 2:
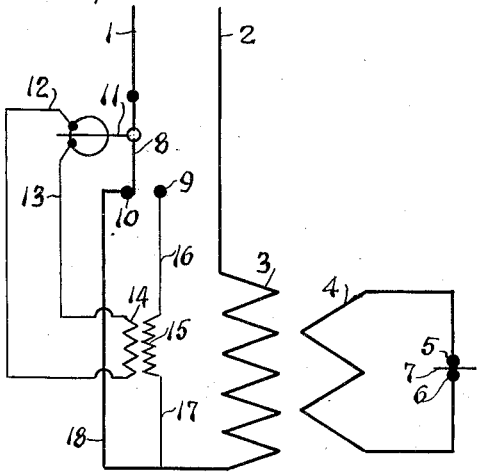
Figure 2 is a similar view showing the parts in welding position with the welding current being applied.

Referring to the drawings in detail, 1 and 2 indicate the alternating current power lines. In the line 2 is the welding circuit primary winding 3 associated with the welding circuit secondary 4 having the electrodes 5 and 6, between which is engaged the work 7. The line 1 has a switch member 8 alternately engaging the terminals 9 and 10. This switch member is actuated by the relay 11. The relay 11 is actuated through the wires 12 and 13 of a circuit including the secondary winding 14 associated with the primary winding 15, such windings constituting a relay transformer of the control circuit comprising the lines 12 and 13. The primary winding 15 of this transformer is connected into the lines 16 and 17. The line 18 connects directly from the terminal 10 to the welding circuit primary 3. It will be thus noted that I provide a welding circuit comprising a source of welding current and a primary winding and a work circuit comprising the electrodes, work piece and the secondary of the welding transformer. The control circuit comprises the relay welding circuit switch and the relay transformer in the control circuit comprising the secondary of the transformer, while the primary winding of the relay transformer is in circuit with the welding circuit in idle position.

In operation, upon applying the electrodes 5 and 6 to the work 7 with increasing pressure and decreasing resistance, the resistance finally decreases to a point where the work is ready for the application of welding current to perform a suitable weld.

Up to this time only negligible current is flowing due to transformer impedance. The relay transformer comprising the windings 14 and 15 is for the purpose of transforming current in the circuit to a suitable degree. It shall be understood that the pilot current, active during the control period is to be distinguished from welding current active during the heating period. Current is, therefore, flowing in the idle position through the primary 3 of the welding circuit transformer and makes current available at the electrode tips 5 and 6 even though the secondary welding circuit is still open.

When the electrode tips 5 and 6 are brought together on the work 7 as the closing movement continues and the parts are pressed together thereby closing the secondary welding circuit 4, available current is increasingly consumed due to the decrease of resistance in the secondary circuit 4. The control circuit is becoming increasingly energized and, upon being sufficiently energized at a predetermined value, the relay 11 will operate to move the switch member 8 from the terminal 9 to the terminal 10 connecting the alternating current lines directly with the welding trasnformer so that welding current will pass to the work.

Figure 3:
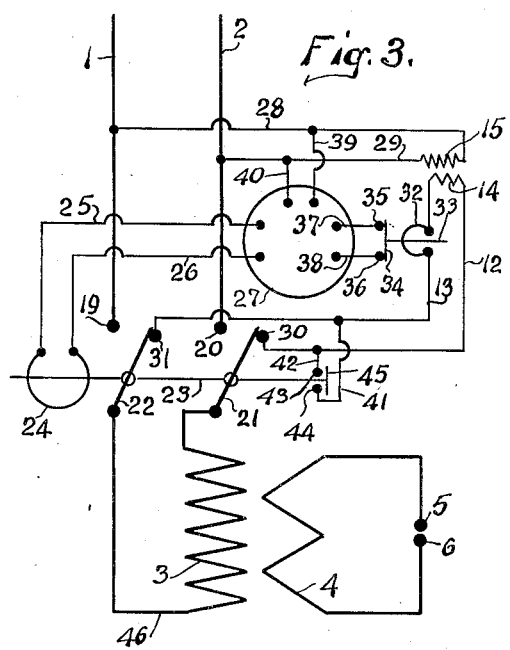
Figure 3 is a diagram showing a modified form of circuit in "at rest" position, the circuit including a timer and lock-out device for opening the circuit upon the completion of the weld.
Figure 4:
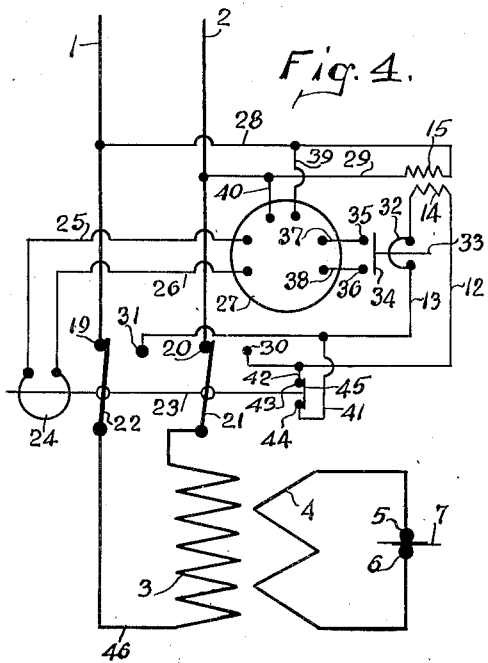
Figure 4 is a similar view to Figure 3 showing the state of the circuit during the welding operation.
Figure 5:
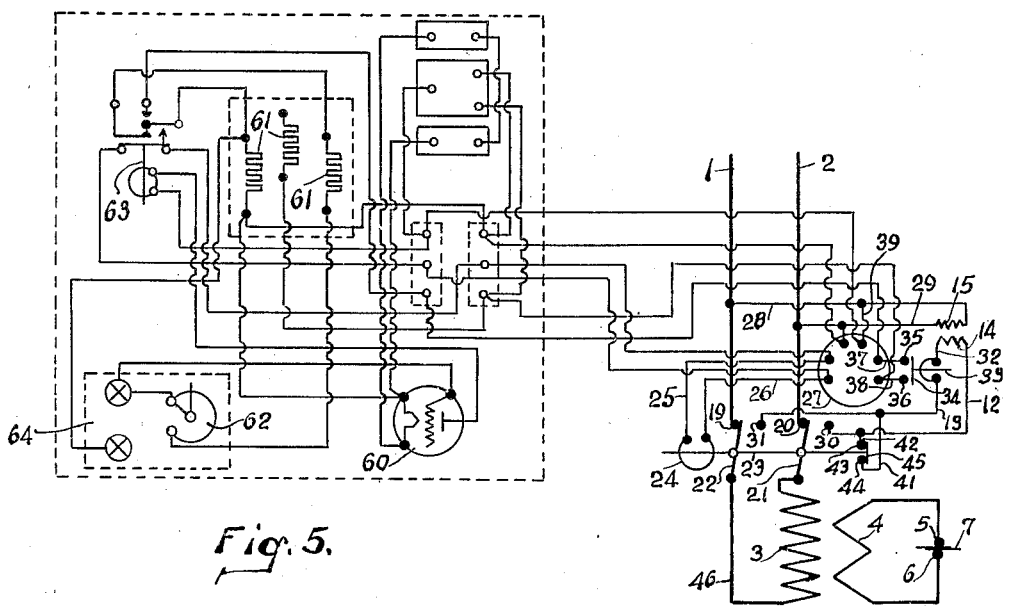
Figure 5 is an electrical diagram showing a typical timer circuit.

When it is desired to provide a timing mechanism to lock the circuit in welding position for a predetermined time and then unlock it, I provide the arrangement shown in Figures 3, 4 and 5.

It will be understood that the exact form and details of this timer and lock-out device form no part of my invention as I may employ any one of a number of different types of mechanism for this purpose. Any suitable instrumentality, such as illustrated, or its equivalent, will do.

Turning specifically to Figures 3, 4 and 5, I again have the alternating current lines 1 and 2 terminating at the terminals 19 and 20 which are engageable by the switch members 21 and 22 that are actuated by the relay core 23 operating in the relay coil 24 which is connected by wires 25 and 26 into a timer 27.

Connected across the supply lines 1 and 2 is a transformer circuit controlling the current source designated 28 and 29 containing the primary 15 and the secondary 14 of a control circuit transformer. The secondary 14 is contained in a circuit comprising the lines 12 and 13. These lines terminate at 30 and 31 for engaging the switch arms 21 and 22 in open position of the circuit, that is, in idle position. In the line 13 is a coil 32 having a core 33 operating a switch 34 which rests upon the terminals 35 and 36 of the wires 37 and 38 entering in the timer 27. Likewise, the wires 28 and 29 are connected by the wires 39 and 40 into the timer 27.

Connected across the lines 12 and 13 are the wires 41 and 42 having the terminals 43 and 44 which are engaged by the switch member 45 which is mounted on one end of the core 23 of the relay switch that operates the switch members 21 and 22.

In operation, upon the predetermined resistance being accomplished in the work pieces by the electrodes 5 and 6, the relay 32 is energized and circuits 25 and 26 closed by timer switch 63 (see Figure 5), thus energizing relay 24 which through core 23 switches 21 and 22 connect the primary circuit 46 to the supply lines 1 and 2 thereby imposing upon the secondary welding circuit 4 through the electrodes suitable welding current for performing the welding which continues until the timer and lock-out device operates, as hereinafter described.

In the diagrams as indicated in Figures 3 and 4, the control current is taken from the alternating current power lines 1 and 2 but, under some circumstances, it may also be taken from another source to avoid influences of surges from the welding transformer.

When the current is taken in on the lines 1 and 2 it is transformed into suitable amperage voltage ratio leading into the relay 32—33 which is a starting relay.

At this time the current flow through the starting relay is not sufficient to operate it. The control current also passes through the main contactor in control position through the welding transformer primary 3 and is made available at the electrodes but is of negligible value when the electrodes are open. As the electrodes are pressed together, the resistance in the secondary 4 between the tips is decreased to the desired value.

The double pole switch is actuated and the circuit is closed for the application of welding current and is locked in this position for a duration which is predetermined by the timer 27, of which a detailed diagram is shown in Figure 5. After the welding current has been applied for a predetermined time this double pole switch is broken off, locked out of the welding position and reset into "at rest" position. Figures 1 and 3 indicate this at rest position. The "at rest" position is at the same time the control position, in which the apparatus is again reset for a new operation cycle.

This timer may be any mechanism which controls the duration of the dwell of the welding current breaking the welding current after a predetermined time has elapsed. This may be done manually or automatically, as set forth in the arrangement in Figure 5.

My particular invention in this application is directed to starting the welding current under specific resistance conditions between the electrodes.

Reclosing of the relay 32—33 will not cause a starting of the welding current but only the opening of relay 32—33 will start the welding current.

45 and 23 are mechanically so connected that 45 will make contact at the instant 23, 22 and 21 break from 30 and 31.

Referring to Figure 5 and the timer circuit for opening the circuit at the end of a weld, I have provided a timing circuit working upon the principle of regulating the opening of the circuit according to the discharge of a condenser through a fixed resistance which will take a given time to discharge. If the charge is maintained at the same value and the value of the resistance increased, a longer time will be required to discharge the condenser, and vice versa.

Charging of the condenser is accomplished by closing of 34 with 35 and 36 as 32 is de-energized, dropping 33 and 34 into contact with 35 and 36. 32, 33, 34, 35 and 36 are the component members of the normally closed starting relay.

The condenser charge is impressed upon the grid of a tube 60 causing it to be non-conductive dropping out relay 63 and closing the contactor to energize the welding contactor. The contacts are shunted by a variable discharge resistor 62 and the discharge takes place until such a point as the voltage on the condenser is insufficient to stop the operation of the tube further. At this point the tube 60 will again conduct opening 63, breaking circuit 25, causing 19 and 20 to disconnect from 21 and 22, thus opening the welding contactor.

A variable timing is obtained by means of a variable rheostat 62 connected to discharge across the condenser. For instance, a typical equipment is arranged for a maximum of 1.75 seconds and a minimum of about .15 seconds.

It will be understood that in practice it may be desirable to employ separate sources of current for the timer from that supply to the welder so that the line surges will not cause erratic timing.

This application is a continuation of the application of Siegfried Schnetzer and Thomas H. Huff, Serial No. 615,924, filed June 7, 1932, which was filed in the names of the joint inventors, Siegfried Schnetzer and Thomas H. Huff, by error and should have been filed as herein provided in the name of Siegfried Schnetzer, who is the sole inventor of the subject matter hereof.

It will be understood that I desire to comprehend within my invention such modifications as may be necessary to adapt it to varying conditions and uses.

Having thus fully described my invention, what I claim as new and desire to secure by Letters Patent, is:

1. In combination, a welding circuit having a primary of a transformer, an electrode welding circuit having a secondary of the transformer, a switch in one part of the welding circuit, and a control circuit, a transformer therein, the primary thereof being connected with the welding circuit, whereby said switch is held in open position to render the welding circuit inoperative for the application of welding current until the resistance in the electrode circuit so affects the control circuit by reason of the decrease of such resistance that said switch is closed and the full value of the welding current is applied to the primary winding in the welding circuit.

2. In combination, a primary welding circuit, a secondary welding circuit, a switch in the primary circuit and a control circuit having a transformer inductively related with the primary circuit, said switch being operable upon a decrease of resistance in the secondary welding circuit to close the primary welding circuit, when the control circuit is energized.

3. In combination, a primary welding circuit, a secondary welding circuit, a switch in the primary circuit and a control circuit operable upon a decrease of resistance in the secondary welding circuit to close the primary welding circuit, and a transformer between the primary welding circuit and the control circuit whereby the effect of decreased resistance in the secondary welding circuit is transmitted to the control circuit to close the primary welding circuit.

4. In combination, a primary welding circuit, a secondary welding circuit, a switch in the primary circuit and a control circuit operable upon a decrease of resistance in the secondary welding circuit to close the primary welding circuit, a transformer between the primary welding circuit and the control circuit whereby the effect of decreased resistance in the secondary welding circuit is transmitted to the control circuit to close the primary welding circuit, and timer mechanism for unlocking the primary welding circuit after the lapse of a predetermined time.

5. In combination, a primary welding circuit having a primary winding, a switch in said circuit, a line connecting a portion of said primary circuit to said switch containing the primary of a control circuit transformer, a control circuit containing the secondary of said transformer, means in said control circuit for actuating said switch to move it from engagement with the line containing the primary of the control circuit transformer to the line containing the primary of the welding transformer, whereby, upon the accomplishment of a predetermined reduction of resistance in the secondary of the welding circuit, full welding current will be applied thereto through the primary circuit and primary welding circuit.

6. In combination, a primary welding circuit having a primary winding, a switch in said circuit, a line connecting a portion of said primary circuit to said switch containing the primary of a control circuit transformer, a control circuit containing the secondary of said transformer, means in said control circuit for actuating said switch to move it from engagement with the circuit containing the primary of the control line transformer to the line containing the primary of the welding transformer, whereby, upon the accomplishment of a predetermined reduction of resistance in the secondary of the welding circuit, full welding current will be applied thereto through the primary circuit and primary welding circuit, and means for rendering said welding circuit inoperative upon the lapse of a predetermined time.

7. In combination, a welding circuit having a primary portion and a secondary portion, a control circuit having a primary portion shunting a part of the welding circuit and a secondary portion having a switch therein operable upon the energizing of said secondary portion of the control circuit, which is caused by a decrease in the resistance in the secondary portion of the welding circuit when the electrodes are brought into contact with the work, to render the primary portion of the welding circuit fully operative to supply current to the electrodes to effect the weld.

8. In combination, supply lines for alternating current, a two-pole switch, a primary welding circuit containing the primary of a welding transformer, a secondary welding circuit containing the secondary of the welding transformer and the welding electrodes, a control circuit, a relay in said control circuit for actuating the two-pole switch, a primary control circuit containing the primary of the control circuit transformer connected across the supply lines, a secondary circuit containing the secondary of the control circuit transformer engageable with said two-pole switch, a starting relay in said control circuit, said secondary circuit including a third switch connected to the two-pole switch adapted to close the secondary control circuit upon the opening of the two-pole switch with respect to the secondary control circuit.

9. In combination, alternating current power lines, a primary circuit containing the primary of a welding transformer, a secondary circuit containing the secondary of a welding transformer and the welding electrodes, a control secondary circuit containing the secondary of a control circuit transformer, said circuit engageable by a two-pole switch, a two-pole switch, a primary control circuit connected across the power lines containing the primary of the control circuit and transformer, a relay circuit connected to said two-pole switch, a switch operating said relay circuit and a relay for operating said switch in the secondary control circuit operable by the relay operating the two-pole switch whereby, when the two-pole switch disengages from the secondary control circuit said third switch closes said secondary circuit and the two-pole switch relay of the control circuit is opened.

10. In combination, alternating current power lines, a primary circuit containing the primary of a welding transformer, a secondary circuit containing the secondary of a welding transformer and the welding electrodes, a control secondary circuit containing the secondary of a control circuit transformer, said circuit engageable by a two-pole switch, a two-pole switch, a primary control circuit connected across the power lines containing the primary of the control circuit and transformer, a relay circuit connected to said two-pole switch, a switch operating said relay circuit and a relay for operating said switch in the secondary control circuit operable by the relay operating the two-pole switch whereby, when the two-pole switch disengages from the secondary control circuit said third switch closes said secondary circuit and the two-pole switch relay of the control circuit is opened, and timer mechanism associated with said control circuits adapted to hold them in the last mentioned position with their switches until a predetermined time has elapsed whereupon said two-pole switch is opened and the welder is rendered inoperative.

SIEGFRIED SCHNETZER.